US008856867B1

(12) United States Patent
Scalora et al.

(10) Patent No.: US 8,856,867 B1
(45) Date of Patent: Oct. 7, 2014

(54) TECHNIQUE FOR CONTROLLING ACCESS TO PROGRAM ASSETS

(75) Inventors: Michael A. Scalora, Orem, UT (US); Jason A. Hunter, Orem, UT (US); Kent S. Russell, Orem, UT (US); Mark R. Tyler, Orem, UT (US)

(73) Assignee: Intuit Inc., Mountain View, CA (US)

( * ) Notice: Subject to any disclaimer, the term of this patent is extended or adjusted under 35 U.S.C. 154(b) by 986 days.

(21) Appl. No.: 11/770,147

(22) Filed: Jun. 28, 2007

(51) Int. Cl.
*G06F 21/00* (2013.01)
(52) U.S. Cl.
USPC .................................................. 726/2; 726/29
(58) Field of Classification Search
None
See application file for complete search history.

(56) References Cited

U.S. PATENT DOCUMENTS

| 2002/0111848 | A1* | 8/2002 | White ............................. 705/10 |
| 2004/0039916 | A1* | 2/2004 | Aldis et al. .................... 713/177 |
| 2005/0102240 | A1* | 5/2005 | Misra et al. ..................... 705/59 |
| 2006/0253587 | A1* | 11/2006 | Tullis et al. ................... 709/226 |
| 2007/0078776 | A1* | 4/2007 | Wang .............................. 705/59 |

* cited by examiner

*Primary Examiner* — Philip Chea
*Assistant Examiner* — Carlton Johnson
(74) *Attorney, Agent, or Firm* — Park, Vaughan, Fleming & Dowler LLP; Steven E. Stupp

(57) ABSTRACT

A system that controls access to program assets, such as software programs or modules, is described. During operation, this system associates a first license code with a first group of program assets and associates a first master code with the first license code, where the first group of program assets includes one or more program assets associated with a first provider, and the first license code identifies the first master code. Then, the system provides the first license code, the first master code, and a pre-defined function to the first provider, and hosts the first group of program assets on a website. Note that the first master code and the pre-defined function allow the first provider to generate a first validation code for a customer. Moreover, the first validation code and the first license code, at least in part, allow the customer to access the first group of program assets hosted on the website, thereby facilitating independent marketing of the first group of program assets by the first provider.

3 Claims, 5 Drawing Sheets

PROGRAM ASSET 510-1 → GROUP(S) 512-1 | PROVIDER(S) 514-1 | LICENSE CODE(S) 516-1 | MASTER CODE(S) 518-1 | ...

PROGRAM ASSET 510-2

GENERATED CODE 610-1 → TIME STAMP/DATE 612-1 | FUNCTION(S) 614-1 | LICENSE CODE(S) 616-1 | MASTER CODE(S) 618-1 | PROGRAM ASSET(S) 620-1 | ...

GENERATED CODE 610-2

...

TECHNIQUE FOR CONTROLLING ACCESS TO PROGRAM ASSETS

BACKGROUND

The present invention relates to techniques for controlling access to program assets, such as software programs or modules, which are hosted on a computer system.

Providers of program assets, such as programs or program modules, often use hosting services to deploy the program assets via a website maintained by an external hosting company. Outsourcing the hosting of such program assets enables the asset provider to reduce operating expenses and to benefit from the larger economies of scale. It also enables the program assets to reach a larger market, which is accessible via the external hosting company.

Unfortunately, such third-party hosting often complicates the marketing of the program assets and the operation of the website. For example, it may be difficult for the external hosting company to identify valid customers of the asset providers and to associate the valid customers with program assets that they have paid to access. Consequently, proper operation of the website often requires the external hosting company and the asset providers to share detailed information about customers and associated program assets so that the external hosting company can determine customer authorizations. However, many asset providers consider such information to be very sensitive or secret, and are hence reluctant to provide it. Therefore, the current need to share sensitive information with the external hosting company may make authorizing access to the program assets challenging.

SUMMARY

One embodiment of this invention provides a system that controls access to program assets. During operation, this system associates a first license code with a first group of program assets and associates a first master code with the first license code, where the first group of program assets includes one or more program assets associated with a first provider, and the first license code identifies the first master code. Then, the system provides the first license code, the first master code, and a pre-defined function to the first provider, and hosts the first group of program assets on a website. Note that the first master code and the pre-defined function allow the first provider to generate a first validation code for a customer. Moreover, the first validation code and the first license code, at least in part, allow the customer to access the first group of program assets hosted on the website, thereby facilitating independent marketing of the first group of program assets by the first provider.

In some embodiments, the system subsequently receives the first validation code, the first license code, and a generated code from the customer. Then, the system retrieves the first master code based on the received first license code. Next, the system authorizes the customer to access the first group of program assets based on the first validation code, the generated code, the first master code, and the pre-defined function. For example, the system may authorize the customer by: determining a second validation code based on the first master code, the generated code, and the pre-defined function; comparing the first validation code and the second validation code; and authorizing the customer to access the first group of program assets if the first validation code matches the second validation code. Note that in some embodiments the generated code includes a pseudorandom sequence, and/or the first master code and the generated code each include at least 64 bits.

In some embodiments, the system authorizes access by the customer to the first group of program assets using first information provided by the customer to the website and second information available to the website. Note that the first information (the first validation code, the first license code, and the generated code) may be provided to the customer by the first provider. Moreover, the second information may include the first master code and the pre-defined function.

In some embodiments, the first validation code associated with the customer is distinct from other validation codes used by other customers.

In some embodiments, the one or more program assets include software modules.

In some embodiments, the pre-defined function includes a cryptographic hash function, such as a Secure Hash Algorithm (SHA) hash function and/or a Message Digest (MD) hash function.

In some embodiments, the system associates a second license code with a second group of program assets and associates second master code with the second license code. Note that the second group of program assets (which includes one or more program assets) is associated with the first provider or a second provider, and the second license code identifies the second master code. Then, the system provides the second license code, the second master code, and the pre-defined function to the first provider or the second provider.

Another embodiment provides a method for controlling access to the program assets. This method may perform at least some of the above-described operations.

Another embodiment provides a computer program product for use in conjunction with the system. This computer program product may include instructions corresponding to at least some of the above-described operations.

Another embodiment provides another system (as well as a related method and/or computer program product) for controlling access to program assets. During operation, this system associates the first license code with the first group of program assets and associates the first master code with the first license code. Then, the system generates the first validation code based on the first master code, the first generated code, and the pre-defined function. Next, the system provides the first license code and the first validation code to the first provider. Moreover, the system hosts the first group of program assets on the website.

BRIEF DESCRIPTION OF THE FIGURES

FIG. 5 is a block diagram illustrating a data structure in accordance with an embodiment of the present invention.

FIG. 6 is a block diagram illustrating a data structure in accordance with an embodiment of the present invention.

Note that like reference numerals refer to corresponding parts throughout the drawings.

DETAILED DESCRIPTION

Figure 1:
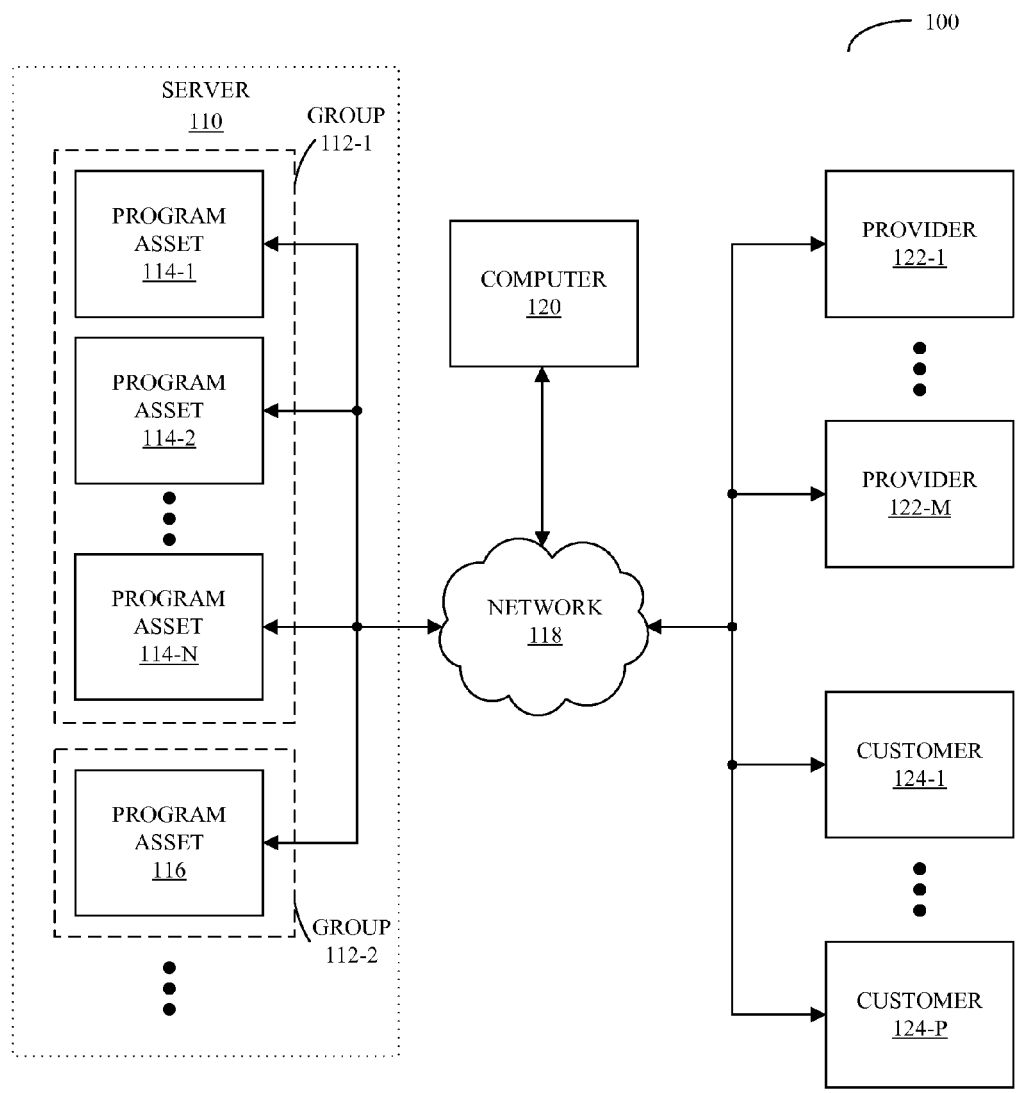
FIG. 1 is a block diagram illustrating a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. Examples of non-transitory computer-readable storage media include, but are not limited to, volatile memory, non-volatile memory, magnetic and optical storage devices such as disk drives, magnetic tape, CDs (compact discs), DVDs (digital versatile discs or digital video discs).

Embodiments of a computer system, a method, and a computer program product (i.e., software) for use with the computer system are described. These systems, software, and processes may be used to control access to program assets (such as software programs or modules) hosted on the computer system. In particular, the computer system may associate a license code and a master code with a group of program assets (which may include one or more program assets) from a provider of the group of program assets. Then, the computer system may provide the license code, the master code, and a pre-defined function (such as cryptographic hash function) to the provider. Using the pre-defined function, the master code, and a generated code (such as a pseudo-random or a random number), the provider may generate a validation code for a customer. Note that in some embodiments each customer receives a unique validation code.

Furthermore, the customer may subsequently provide the validation code, the license code, and the generated code to the computer system. Using the master code (which is associated with the license code), the generated code, and the pre-defined function, the computer system regenerates the validation code and confirms that it matches the validation code provided by the customer, thereby confirming that the customer is authorized to access the group of program assets. Note that this technique may allow the provider to independently market the group of program assets.

In some embodiments, the computer system generates the validation code for the provider (and, thus, the customer) using the pre-defined function, the master code, and the generated code. In this case, the computer system provides the license code and the validation code to the provider, who in turn provides this information to the customer.

These techniques may be implemented as a stand-alone software application, or as a program module or subroutine in another application.

Furthermore, at least a portion of the program may be configured to execute on a client computer (such as a personal computer, a laptop computer, cell phone, PDA, or other device capable of manipulating computer readable data) or remotely from a client computer via computing systems over a network (such as the Internet, Intranet, LAN, WAN, MAN, or combination of networks, or other technology enabling communication between computing systems). Therefore, the information used to control access to the program assets may be stored locally (for example, on a local computer) and/or remotely (for example, on a computer or server that is accessed via a network).

We now describe embodiments of systems, devices and processes for controlling access to program assets. FIG. 1 presents a block diagram illustrating an embodiment of a computer system 100. Within computer system 100, a server 110 is used to host multiple groups of program assets 112. Some of the groups of program assets 112 may include multiple program assets (such as program assets 114 in group of program assets 112-1) while other groups may include one program asset (such as program asset 116 in group of program assets 112-2). In particular, an entity or organization may host program assets 114 and 116 (such as software modules or applications) developed by multiple providers 122 (which are, in general, separate from the entity that hosts the website), and customers 124 may access at least some of the program assets 114 and/or 116 via a network 118. For example, the entity may provide a web-based marketplace for business analysis, and the providers 122 may provide financial analysis modules that are hosted on the website and are accessed by customers 124 of the providers 122.

As noted previously, access control is often a challenge in third-party (i.e., the entity) hosted websites because the providers 122 may be reluctant to provide sensitive information about their customers (which is needed to authorize access) to the third party. Furthermore, the third party may not wish to provide access control services because of liability concerns as well as additional website complexity and expense. In the discussion the follows, an integrated access-control technique is described. This technique simplifies the operation of the website and reduces the amount of information (and in particular, sensitive information) that needs to be shared between the providers 122 and the entity that hosts the website.

In particular, access control may be implemented using a shared-encryption technique. In this technique, each group of program assets 112 (such as group of program assets 112-1) is assigned or associated with a license code by the entity. In addition, a master key or code is assigned to or associated with each license code. In some embodiments, the master code associated with each license code is unique. Note that the license codes and master codes may be stored on the server 110 or on a remote computer 120. Also note that if a provider has multiple groups of program assets 112 on the server 110, this provider may be assigned or associated with more than one license code and/or master code.

As discussed further below, the master codes, generated codes, and one or more pre-defined functions may be used to generate validation codes for the groups of program assets 112. These validation codes are used, at least in part, to control access by the customers 124 to the program assets 114 and/or 116.

In an exemplary embodiment, a given pre-defined function is the same for multiple license codes (i.e., groups of program assets 112) and providers 122. Moreover, the one or more pre-defined functions may include one or more cryptographic hash functions, such as a Secure Hash Algorithm (SHA) hash function and/or a Message Digest (MD) hash function. Note that the generated codes may be pseudorandom or random numbers. In some embodiments, a different generated code is used to generate each validation code, and each validation code is unique (i.e., every customer 124 receives a different validation code).

Note that in some embodiments the providers 122 generate the validation codes for the customers 124. In these embodiments, the entity provides appropriate license code(s), master code(s), and pre-defined function(s) to a given provider (such as provider 122-1). However, in some embodiments the validation codes are generated by the entity, and are then provided to the appropriate providers 122, and ultimately, to the customers 124. In these embodiments, the entity provides the appropriate license code(s), generated code(s), and validation code(s) to the providers 122.

When a provider, such as the provider 122-1, sells authorization to access one or more group of program assets 112, the provider 122-1 provides a customer (such as customer 124-1) with a license code and a validation code. If the provider 122-1 generated the validation code (as opposed to the entity), the customer 124-1 also receives the generated code (which was used to generate the validation code).

Then, when the customer 124-1 attempts to access one or more of the groups of program assets 112, the customer 124-1 provides the license code, the validation code, and optionally the generated code to the entity via the website. Note that in some embodiments distribution of the various codes is automated. For example, the provider 122-1 may send the customer 124-1 an email with a link (such as a URL) that includes the codes (i.e., the codes are included in the URL). When the customer 124-1 activates the link, the customer 124-1 provides the embedded codes to the website and attempts to access one or more of the groups of program assets 112.

Once the website has received the codes (such as the validation code, the license code, and the optional generated code), the computer system 100 retrieves: the master code associated with the license code; the appropriate pre-defined function; and, if the computer system 100 generated the validation code, the generated code. Note that in general the master code is private, i.e., is kept secret by the entity and the providers 122.

Next, the computer system 100 regenerates the validation code using: the pre-defined function, the master code, and the generated code. This regenerated validation code is compared to the validation code provided by the customer 124-1, and if there is a match, the customer 124-1 may be allowed to access one or more of the groups of program assets 112.

In an exemplary embodiment, the validation code is regenerated using $$f(M+K)=V,$$

where f is the pre-defined function, M is the master code, K is the generated code, and V is the validation code. Note that in some embodiments the master code and the generated code each include at least 64 bits (for example, 14 digits).

Therefore, in general the computer system 100 authorizes access by the customer 124-1 to one or more of the groups of program assets 112 using first information provided by the customer 124-1 to the website and second information available to the website. Note that the first information (including the validation code, the license code, and optionally the generated code) may be provided to the customer 124-1 by the provider 122-1. Moreover, the second information may include: the master code associated with the license code, the pre-defined function, and optionally the generated code.

In some embodiments the computer system 100 includes: fewer or additional components, two or more components are combined into a single component, and/or a position of one or more components may be changed.

Figure 2:
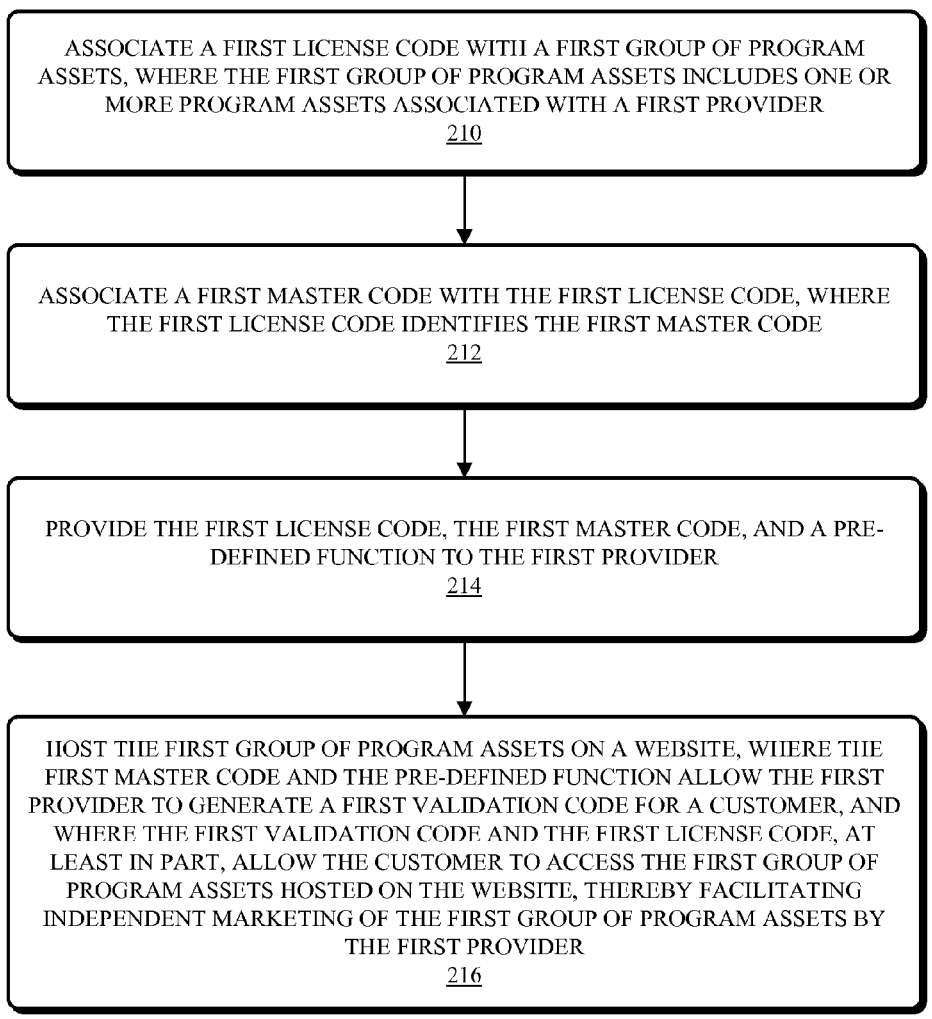
FIG. 2 is a flow chart illustrating a method for controlling access to program assets in accordance with an embodiment of the present invention.

We now discuss methods for controlling access to program assets. More specifically, FIG. 2 presents a flow chart illustrating an embodiment of a method 200 for controlling access to program assets, which may be implemented in a computer system (such as the computer system 100 in FIG. 1). During operation, this system associates a first license code with a first group of program assets (210) and associates a first master code with the first license code (212), where the first group of program assets includes one or more program assets associated with a first provider, and the first license code identifies the first master code. Then, the system provides the first license code, the first master code, and a pre-defined function to the first provider (214), and hosts the first group of program assets on a website (216). Note that the first master code and the pre-defined function allow the first provider to generate a first validation code for a customer. Moreover, the first validation code and the first license code, at least in part, allow the customer to access the first group of program assets hosted on the website, thereby facilitating independent marketing of the first group of program assets by the first provider.

Figure 3:
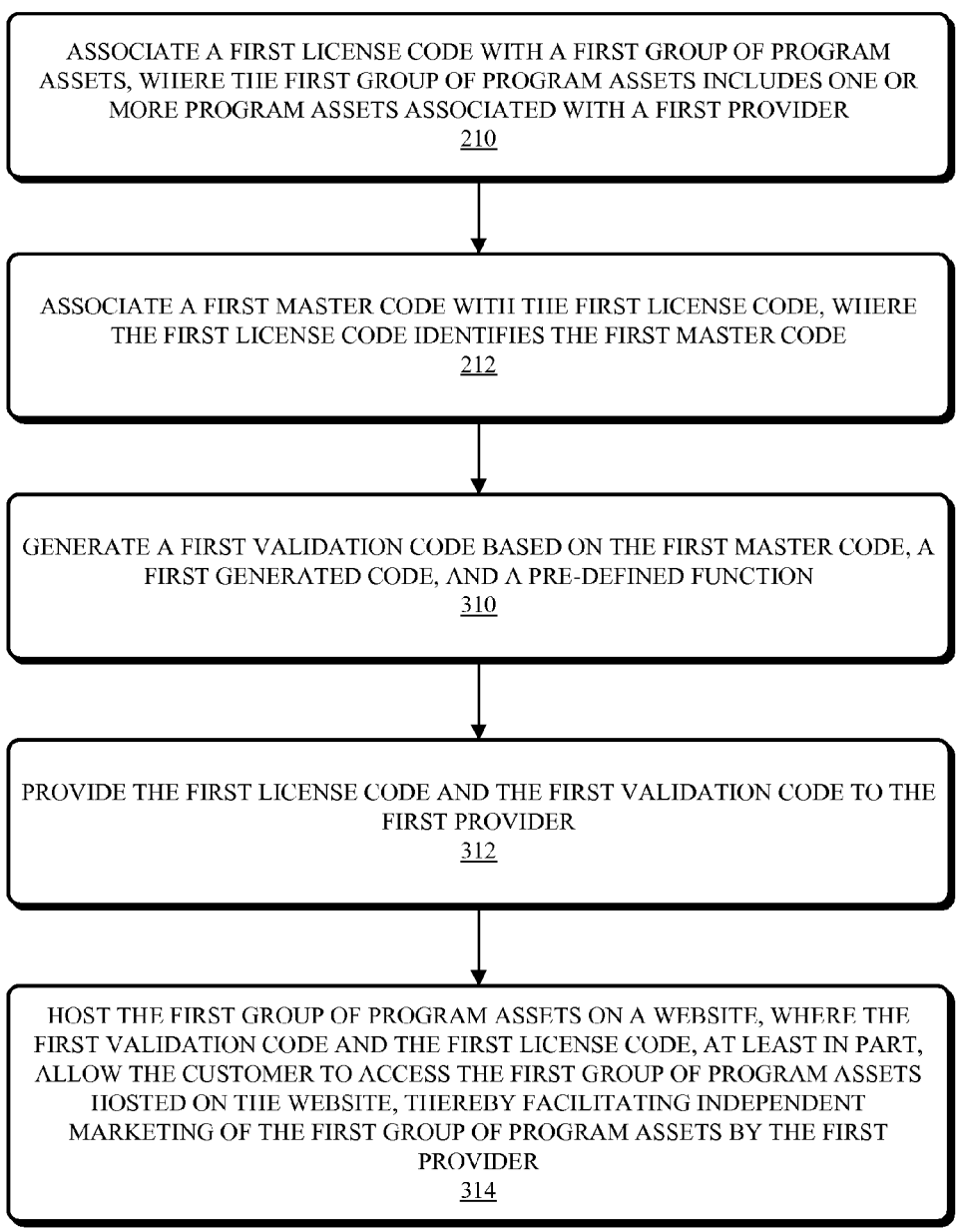
FIG. 3 is a flow chart illustrating a method for controlling access to program assets in accordance with an embodiment of the present invention.

FIG. 3 is a flow chart illustrating an embodiment of a method 300 for controlling access to program assets. During operation, this system associates the first license code with the first group of program assets (210) and associates the first master code with the first license code (212). Then, the system generates the first validation code based on the first master code, the first generated code, and the pre-defined function (310). Next, the system provides the first license code and the first validation code to the first provider (312). Moreover, the system hosts the first group of program assets on the website (314). Note that the first validation code and the first license code, at least in part, allow the customer to access the first group of program assets hosted on the website, thereby facilitating independent marketing of the first group of program assets by the first provider.

Note that in some embodiments of the method 200 (FIG. 2) and/or the method 300 there may be: additional or fewer operations; the order of the operations may be changed; and two or more operations may be combined into a single operation.

Figure 4:
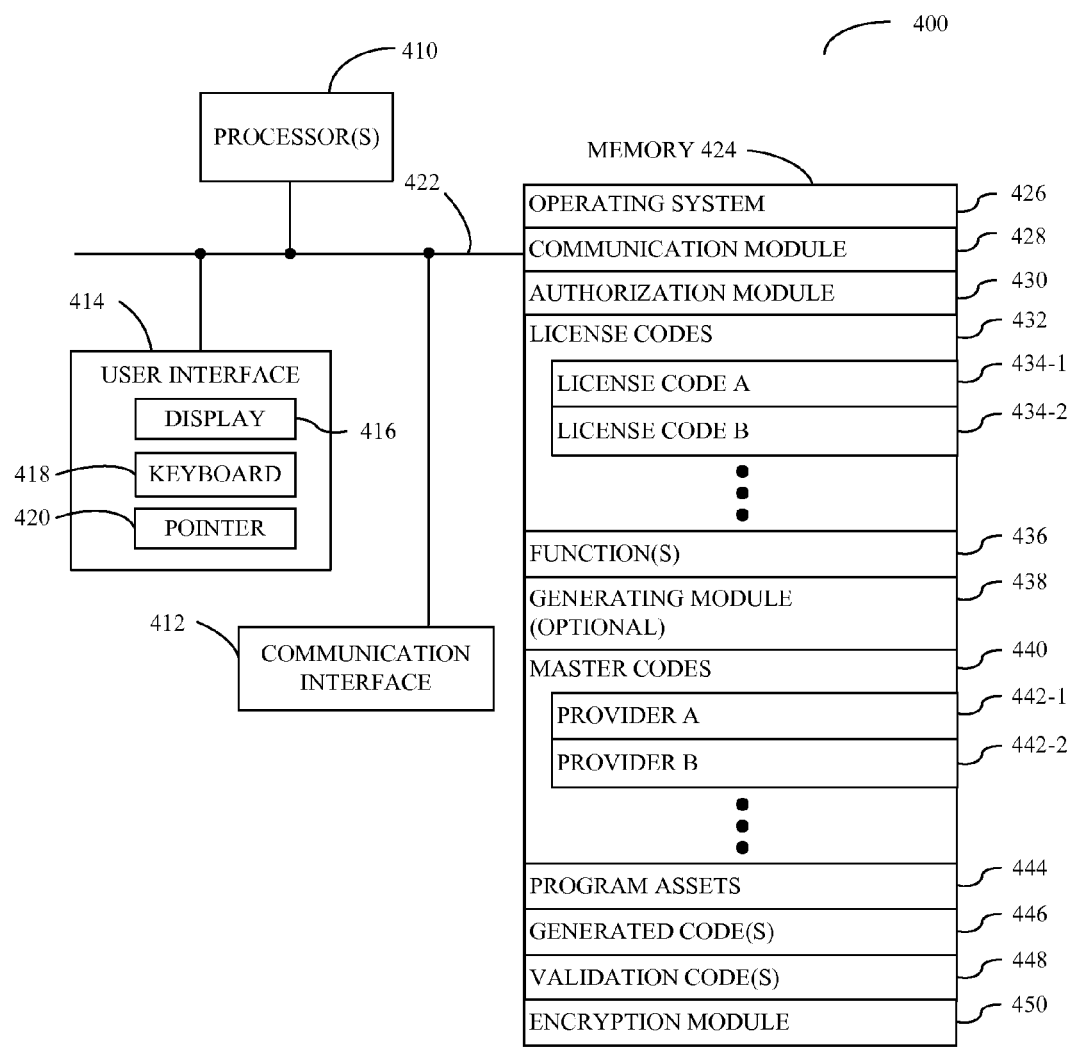
FIG. 4 is a block diagram illustrating a computer system in accordance with an embodiment of the present invention.

We now describe computer systems for implementing these techniques for controlling access to program assets. FIG. 4 is a block diagram illustrating an embodiment of a computer system 400. Computer system 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, FLASH, one or more smart cards, one or more magnetic disc storage devices, and/or one or more optical storage devices. Memory 424 may store an operating system 426 that includes procedures (or a set of instructions) for handling various basic system services for performing hardware dependent tasks. Memory 424 may also store communication procedures (or a set of instructions) in a communication module 428. These communication procedures may be used for communicating with one or more computers and/or servers, including computers and/or servers that are remotely located with respect to the computer system 400.

Memory 424 may include multiple program modules (or a set of instructions), including authorization module 430 (or a set of instructions), optional generating module 438 (or a set of instructions), and/or encryption module 450 (or a set of instructions). Authorization module 430 may associate one or more license codes 432 (such as license code A 434-1 and/or license code B 434-2) with one or more program assets 444 and/or one or more groups of program assets. Moreover, authorization module 430 may also associate one or more master codes 440 (such as those for provider A 442-1 and/or provider B 442-2).

Using one or more of master codes 440, one or more of generated codes 446 (which may be received or generated using optional generating module 438), and one or more of functions 436, authorization module 430 may determine one or more validation codes 448. These codes may be provided to providers and/or may be compared to validation codes provided by customers so that the customers may be authorized to access one or more of the program assets 444.

In some embodiments, at least some of the information exchanged with the providers and/or the customers is encrypted using encryption module 450.

Instructions in the various modules in the memory 424 may be implemented in a high-level procedural language, an object-oriented programming language, and/or in an assembly or machine language. The programming language may be compiled or interpreted, i.e, configurable or configured to be executed by the one or more processing units 410.

Although the computer system 400 is illustrated as having a number of discrete components, FIG. 4 is intended to provide a functional description of the various features that may be present in the computer system 400 rather than as a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more ASICs and/or one or more digital signal processors DSPs.

Computer system 400 may include fewer components or additional components, two or more components may be combined into a single component, and/or a position of one or more components may be changed. In some embodiments the functionality of the computer system 400 may be implemented more in hardware and less in software, or less in hardware and more in software, as is known in the art.

We now discuss data structures that may be used in the computer system 100 (FIG. 1) and/or 400. FIG. 5 is a block diagram illustrating an embodiment of a data structure 500. This data structure may include information for one or more program assets 510. A given program asset, such as program asset 510-1, may include: one or more groups of program assets 512-1 to which program asset 510-1 belongs; one or more providers 514-1 of the program asset 510-1; one or more license codes 516-1 associated with the program asset 510-1; and/or one or more master codes 518-1 associated with the one or more license codes 516-1.

FIG. 6 is a block diagram illustrating an embodiment of a data structure 600. This data structure may include information for one or more generated codes 610. A given generated code, such as generated code 610-1, may include: time stamp/date 612-1; one or more pre-defined functions 614-1 associated with the generated code 610-1; one or more license codes 616-1 associated with the generated code 610-1; one or more master codes 618-1 associated with the one or more license codes 616-1; and/or one or more program assets 620-1 (or groups of program assets) associated with the generated code 610-1.

Note that that in some embodiments of the data structures 500 (FIG. 5) and/or 600 there may be: fewer or additional components; two or more components may be combined into a single component; and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for controlling access to program assets, comprising:

a first entity hosting a first set of program assets;

the first entity receiving a second set of program assets from a second entity, wherein the second entity provides the second set of program assets; and the first entity identifying if a customer of the first entity is also a valid customer of the second entity without receiving information about the valid customer from the second entity, wherein the information is needed to authorize the valid customer to access the second set of program assets, thereby facilitating the second entity to independently market the second set of program assets, wherein the facilitating comprises:

the first entity associating a first license code with the second set of program assets;

the first entity associating a first master code with the first license code, wherein the first master code is a unique master key that is associated with the first license code;

the first entity providing the first license code, the first master code, and a validation function to the second entity, wherein the validation function is a cryptographic function;

the second entity cryptographically generating a first validation code for the valid customer of the second entity by:

combining the master code and a generated code, wherein the generated code is one of a random or a pseudorandom sequence of at least 64 bits, and applying the validation function to the combination of the master code and the generated code;

the second entity providing the first validation code, the generated code, and the license code to the valid customer;

the first entity hosting, on a website, the second set of program assets;

the first entity receiving a request from the customer of the first entity, via the website, to access the second set of program assets, wherein the request includes the first validation code, the first license code, and the generated code;

the first entity cryptographically generating a second validation code for the customer by:

combining the master code and a generated code, and applying the validation function to the combination of the master code and the generated code;

the first entity determining if the first validation code matches the second validation code; and in response to the determining that the first validation code matches the second validation code,
the first entity identifying that the customer is also the valid customer of the second entity,
the first entity authorizing access for the customer to the second set of program assets.

2. A computer system, comprising:
a processor;
memory;
a program module, wherein the program module is stored in the memory and configurable to be executed by the processor, the program module including:
instructions for hosting by a first entity, a first set of program assets;
instructions for receiving by the first entity, a second set of program assets from a second entity, wherein the second entity provides the second set of program assets; and
instructions for identifying by the first entity if a customer of the first entity is also a valid customer of the second entity without receiving information about the valid customer from the second entity, wherein the information is needed to authorize the valid customer to access the second set of program assets, thereby facilitating the second entity to independently market the second set of program assets, wherein the facilitating comprises:
the first entity associating a first license code with the second set of program assets;
the first entity associating a first master code with the first license code, wherein the first master code is a unique master key that is associated with the first license code;
the first entity providing the first license code, the first master code, and a validation function to the second entity, wherein the validation function is a cryptographic function;
the second entity cryptographically generating a first validation code for a customer by:
combining the master code and a generated code, wherein the generated code is one of a random or a pseudorandom sequence of at least 64 bits, and
applying the validation function to the combination of the master code and the generated code;
the second entity providing the first validation code, the generated code, and the license code to the valid customer;
the first entity hosting, on a website, the second set of program assets;
the first entity receiving a request from the customer of the first entity, via the website, to access the second set of program assets, wherein the request includes the first validation code, the first license code, and the generated code;
the first entity cryptographically generating a second validation code for the customer by:
combining the master code and a generated code, and applying the validation function to the combination of the master code and the generated code;
the first entity determining if the first validation code matches the second validation code; and
in response to the determining that the first validation code matches the second validation code,
the first entity identifying that the customer is also the valid customer of the second entity,
the first entity authorizing access for the customer to the second set of program assets.

3. A non-transitory computer-readable storage medium storing instructions that when executed by a computer cause the computer to perform a method for controlling access to program assets, the method comprising:
a first entity hosting a first set of program assets;
the first entity receiving a second set of program assets from a second entity, wherein the second entity provides the second set of program assets; and
the first entity identifying if a customer of the first entity is also a valid customer of the second entity without receiving information about the valid customer from the second entity, wherein the information is needed to authorize the valid customer to access the second set of program assets, thereby facilitating the second entity to independently market the second set of program assets, wherein the facilitating comprises:
the first entity associating a first license code with the second set of program assets;
the first entity associating a first master code with the first license code, wherein the first master code is a unique master key that is associated with the first license code;
the first entity providing the first license code, the first master code, and a validation function to the second entity, wherein the validation function is a cryptographic function;
the second entity cryptographically generating a first validation code for the valid customer of the second entity by:
combining the master code and a generated code, wherein the generated code is one of a random or a pseudorandom sequence of at least 64 bits, and
applying the validation function to the combination of the master code and the generated code;
the second entity providing the first validation code, the generated code, and the license code to the valid customer;
the first entity hosting, on a website, the second set of program assets;
the first entity receiving a request from the customer of the first entity, via the website, to access the second set of program assets, wherein the request includes the first validation code, the first license code, and the generated code;
the first entity cryptographically generating a second validation code for the customer by:
combining the master code and a generated code, and applying the validation function to the combination of the master code and the generated code;
the first entity determining if the first validation code matches the second validation code; and
in response to the determining that the first validation code matches the second validation code,
the first entity identifying that the customer is also the valid customer of the second entity,
the first entity authorizing access for the customer to the second set of program assets.

* * * * *